(No Model.)

A. DUER.
NUT LOCK.

No. 474,315.　　　　　　　　　　Patented May 3, 1892.

Witnesses:
J. J. Painter
G. F. Ewing

Inventor:
Albert Duer
per O. D. Levis
att'y.

United States Patent Office.

ALBERT DUER, OF FOMBELL, PENNSYLVANIA, ASSIGNOR OF ONE-HALF TO O. L. PHILLIS, OF SAME PLACE.

NUT-LOCK.

SPECIFICATION forming part of Letters Patent No. 474,315, dated May 3, 1892.

Application filed December 10, 1891. Serial No. 414,624. (No model.)

*To all whom it may concern:*

Be it known that I, ALBERT DUER, a citizen of the United States, residing at Fombell, in the county of Beaver and State of Pennsylvania, have invented certain new and useful Improvements in Nut-Locks; and I do hereby declare the following to be a full, clear, and exact description of the invention, such as will enable others skilled in the art to which it pertains to make and use the same, reference being had to the accompanying drawings, which form a part of this specification.

My invention relates to an improved nut-lock; and it consists in certain details of construction and combination of parts, as will be fully described hereinafter.

Figure 1:
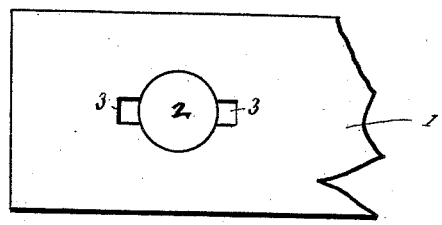
Figure 2:
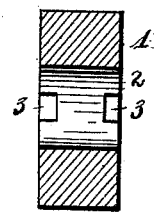
Figure 3:
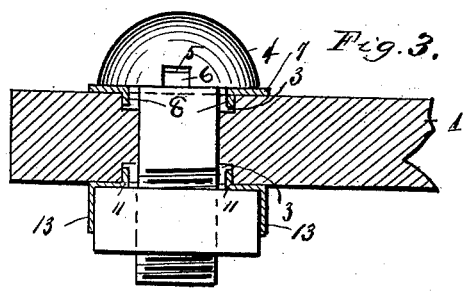
Figure 4:
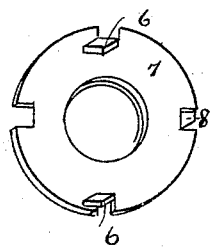
Figure 5:
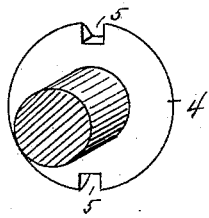
Figure 6:
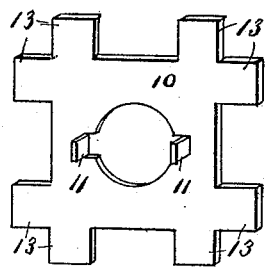

In the accompanying drawings, Figure 1 is a front elevation of the piece through which the bolt to be locked is passed. Fig. 2 is a sectional side elevation through the opening of the same. Fig. 3 is a sectional plan view of the said plate, showing the bolt and the locking device in section. Fig. 4 is a perspective view of the rear washer. Fig. 5 is a perspective view of the head of the bolt, showing the pockets formed therein. Fig. 6 is a perspective view of the front or nut washer.

To put my invention into practice, I form at the front and rear face of the substance 1, through which the bolt passes, an opening 2, having four small pockets 3, two at the front face and two at the rear. Formed in the periphery of the head of the bolt 4 are two pockets 5, which receive two of the projections 6, formed on a circular washer 7. Two other projections 8, formed on this washer 7, are received in the rear pockets of the plate 1, which device locks the bolt to the plate and will prevent the same from turning.

To lock the nut to the bolt, I provide a washer 10, having a circular opening at the center to receive the bolt 4 and two inwardly-projecting portions 11, which enter the pockets formed at the front of the plate 1, and thereby prevent the said washer from turning on the bolt 4. This washer 10 is provided with a number of outwardly-projecting portions 13, which, when bent at right angles to the washer and close to the sides of the nut, will lock the said nut to the bolt, thereby completing a device for locking the bolt to the plate or substance through which the same passes, and also locking the nut to the bolt.

Having thus described my invention, what I claim, and desire to secure by Letters Patent, is—

In a nut and bolt lock, the combination of a plate having a bolt-opening and pockets at opposite sides of said opening and at each end thereof, a washer having lugs or projections at either side, a bolt having recesses in its sides, the lugs on said washer being adapted to enter the pockets at one side of the plate and the recesses in the bolt, the nut, and a second washer having projections adapted to enter the other pockets of the plate, and a series of outwardly-projecting portions adapted to be bent into engagement with the sides of the nut, substantially as described.

In testimony that I claim the foregoing I hereunto affix my signature this 1st day of October, A. D. 1891.

ALBERT DUER. [L. S.]

In presence of—
CHARLES LARGE,
T. F. EWING.